US012675146B2

(12) United States Patent
Takahashi

(10) Patent No.: US 12,675,146 B2
(45) Date of Patent: Jul. 7, 2026

(54) INFORMATION PROCESSING APPARATUS AND METHOD PERFORMED THEREBY

(71) Applicant: Toshiba Tec Kabushiki Kaisha, Tokyo (JP)

(72) Inventor: Takumi Takahashi, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 103 days.

(21) Appl. No.: 18/660,203

(22) Filed: May 9, 2024

(65) Prior Publication Data

US 2025/0093933 A1 Mar. 20, 2025

(30) Foreign Application Priority Data

Sep. 15, 2023 (JP) ................................. 2023-150469

(51) Int. Cl.
*G06F 1/30* (2006.01)
*G06F 1/26* (2006.01)
*H02J 9/06* (2006.01)

(52) U.S. Cl.
CPC ............... *G06F 1/30* (2013.01); *G06F 1/263* (2013.01); *H02J 9/061* (2013.01)

(58) Field of Classification Search
CPC . G06F 1/263; G06F 1/266; G06F 1/28; G06F 1/30; G06F 1/3209; G06F 1/3212;
(Continued)

(56) References Cited

U.S. PATENT DOCUMENTS

| | | | | |
|---|---|---|---|---|
| 4,611,289 A | * | 9/1986 | Coppola ................... | G06F 1/00 713/340 |
| 8,723,362 B2 | * | 5/2014 | Park ........................ | H02J 9/061 307/64 |

(Continued)

FOREIGN PATENT DOCUMENTS

JP H07-295688 A 11/1995

OTHER PUBLICATIONS

Bharti, Prince, et al. "Smart-UPS with a priority-based load management system". 2021. J. Phys. Conf. Ser. 2007. ICCEMME 2021. IOP Publishing. (Year: 2021).*

*Primary Examiner* — Thomas J. Cleary
(74) *Attorney, Agent, or Firm* — Kim & Stewart LLP

(57) ABSTRACT

An information processing apparatus connectable to a UPS, includes motherboards, a first circuit connected to the motherboards to receive first signals therefrom, each first signal indicating whether the corresponding motherboard is operating, a second circuit connected to the motherboards to receive second signals therefrom, each second signal indicating whether power is to be supplied from the UPS to the corresponding motherboard during a power outage, a third circuit for detecting a power outage, and a fourth circuit connected to the first through third circuits. In response to the outage, the fourth circuit supplies power from the UPS to the motherboards when the first and second circuits each receive from at least one motherboard, the first signal indicating that the corresponding motherboard is operating and the second signal indicating that power is to be supplied from the UPS to the corresponding motherboard during a power outage.

7 Claims, 2 Drawing Sheets

(58) Field of Classification Search
CPC .... G06F 1/3228; G06F 1/3243; G06F 1/3246;
G06F 1/3287; H02J 9/002; H02J 9/005;
H02J 9/007; H02J 9/06; H02J 9/062;
H02J 9/061
See application file for complete search history.

(56) References Cited

U.S. PATENT DOCUMENTS

| | | | | |
|---|---|---|---|---|
| 9,760,452 | B2 * | 9/2017 | Kelly | G06F 11/3006 |
| 2001/0004198 | A1 * | 6/2001 | Matsuyama | H01M 10/465 |
| | | | | 320/101 |
| 2006/0047979 | A1 * | 3/2006 | Hsu | G06F 1/30 |
| | | | | 713/300 |
| 2009/0251002 | A1 * | 10/2009 | Cohen | H02J 9/062 |
| | | | | 307/23 |
| 2014/0025980 | A1 * | 1/2014 | Liang | G06F 1/3287 |
| | | | | 713/324 |
| 2015/0241946 | A1 * | 8/2015 | Allen-Ware | G06F 1/3296 |
| | | | | 713/320 |
| 2016/0328010 | A1 * | 11/2016 | Cochran | G06F 1/26 |
| 2020/0125154 | A1 * | 4/2020 | Waterton | G06K 7/10366 |
| 2022/0382350 | A1 * | 12/2022 | Menon | H02J 9/06 |

* cited by examiner

INFORMATION PROCESSING APPARATUS AND METHOD PERFORMED THEREBY

CROSS-REFERENCE TO RELATED APPLICATION(S)

This application is based upon and claims the benefit of priority from Japanese Patent Application No. 2023-150469, filed Sep. 15, 2023, the entire contents of which are incorporated herein by reference.

FIELD

Embodiments described herein relate generally to an information processing apparatus and a method performed thereby.

BACKGROUND

Conventionally, an information processing apparatus such as a server apparatus has a motherboard on which a microcomputer is mounted. Such an information processing apparatus includes an uninterruptible power supply (UPS) for preventing the components installed on the motherboard from being damaged and the data stored therein from being lost when a power outage occurs. For example, the UPS can supply power in the event of a power outage until the motherboard safely shuts down.

However, when a plurality of motherboards are mounted in the information processing apparatus, the UPS sometimes stops supplying power when any of the motherboards shuts down.

SUMMARY OF THE INVENTION

Embodiments of this disclosure provide an information processing apparatus capable of receiving electric power from an UPS until all of the motherboards shut down when a power outage occurs.

In one embodiment, an information processing apparatus connectable to a UPS, comprises a plurality of motherboards; a first circuit connected to the motherboards to receive respective first signals from the motherboards, each of the first signals indicating whether the corresponding motherboard is operating; a second circuit connected to the motherboards to receive respective second signals from the motherboards, each of the second signals indicating whether power is to be supplied from the UPS to the corresponding motherboard during a power outage; a third circuit for detecting a power outage; and a fourth circuit connected to the first through third circuits. In response to the power outage detected by the third circuit, the fourth circuit supplies power from the UPS to the motherboards when the first and second circuits each receive from at least one of the motherboards, the first signal indicating that the corresponding motherboard is operating and the second signal indicating that power is to be supplied from the UPS to the corresponding motherboard during a power outage.

DETAILED DESCRIPTION

Hereinafter, embodiments will be described in detail with reference to the drawings. The present invention is not limited to the embodiments described below.

Figure 1:
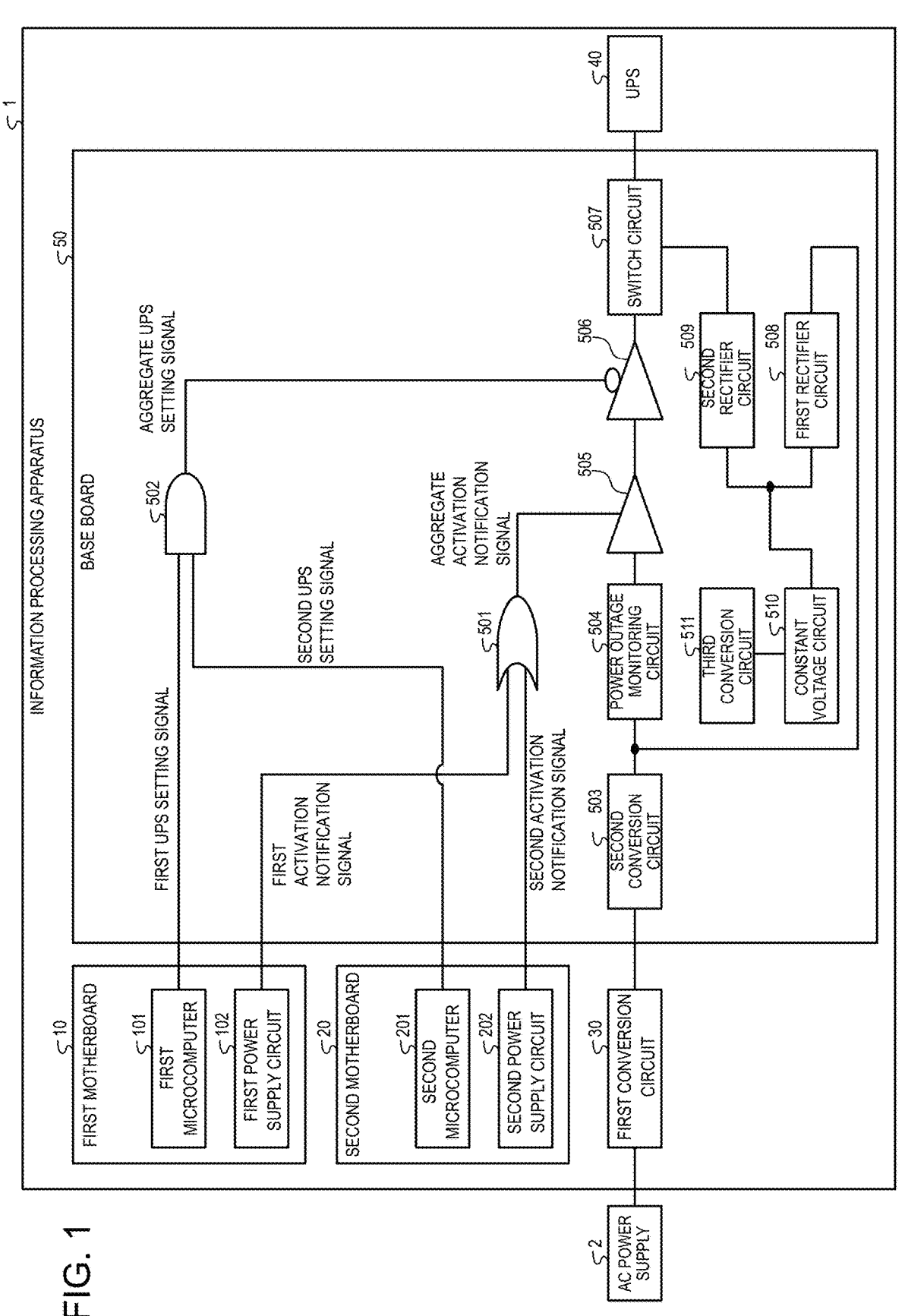
FIG. 1 is a diagram illustrating an information processing apparatus according to an embodiment.

FIG. 1 is a diagram illustrating an information processing apparatus 1 according to an embodiment. The information processing apparatus 1 is a computer such as a server apparatus or a personal computer. The information processing apparatus 1 includes a first motherboard 10, a second motherboard 20, a first conversion circuit 30, an UPS 40, and a base board 50.

The first motherboard 10 and the second motherboard 20 are components for controlling the information processing apparatus 1. The first motherboard 10 and the second motherboard 20 may provide separate functions or may provide the same functions by parallel processing. Further, the information processing apparatus 1 is not limited to two motherboards of the first motherboard 10 and the second motherboard 20, and may have three or more motherboards.

The first motherboard 10 includes a first microcomputer 101 and a first power supply circuit 102. The first microcomputer 101 is a microcomputer that controls at least a part of the information processing apparatus 1. The first microcomputer 101 includes a memory such as a register for storing settings. The storage medium stores an UPS setting indicating whether power is to be supplied from the UPS 40. For example, the first microcomputer 101 receives the power supplied by the UPS 40 during a power outage when the UPS setting indicates that power is to be supplied from the UPS 40. On the other hand, the first microcomputer 101 does not receive power from the UPS 40 even if a power outage occurs when the UPS setting indicates that power is not to be supplied from the UPS 40.

The first microcomputer 101 outputs a first UPS setting signal indicating the UPS setting. That is, the first microcomputer 101 outputs a first UPS setting signal indicating whether or not power is to be supplied from the UPS 40 during a power outage. The first UPS setting signal is turned to a low level when the power is to be supplied from the UPS 40 during a power outage.

The first power supply circuit 102 is a circuit that activates the first motherboard 10. Further, the first power supply circuit 102 outputs a first activation notification signal for notifying the activation state of the first motherboard 10. That is, the first power supply circuit 102 outputs a first activation notification signal indicating whether or not the first motherboard 10 is being activated. For example, the first activate notification signal indicates a high level when the first motherboard 10 is being activated.

The second motherboard 20 includes a second microcomputer 201 and a second power supply circuit 202. The second microcomputer 201 is a microcomputer that controls at least a part of the information processing apparatus 1. The second microcomputer 201 includes a memory such as a register for storing settings. The memory stores a UPS setting of whether or not power is to be supplied from the UPS 40 during a power outage. The second microcomputer 201 receives the power supplied by the UPS 40 during a power outage when the UPS setting indicates that power is to be supplied. On the other hand, the second microcomputer 201 does not receive power from the UPS 40 even if a power outage occurs when the UPS setting indicates that power is not to be supplied.

The second microcomputer 201 outputs a second UPS setting signal indicating the UPS setting. That is, the second microcomputer 201 outputs a second UPS setting signal indicating whether or not power is to be supplied from the UPS 40 during a power outage. The second UPS setting signal is turned to the low level when the power is to be supplied from the UPS 40 during a power outage.

The second power supply circuit 202 is a circuit that activates the second motherboard 20. Further, the second power supply circuit 202 outputs a second activation notification signal for notifying the activation state of the second motherboard 20. That is, the second power supply circuit 202 outputs a second activation notification signal indicating whether or not the second motherboard 20 is being activated. For example, the second activate notification signal indicates a high level when the second motherboard 20 is being activated.

The first conversion circuit 30 is a circuit including an Alternating Current (AC)-Direct Current (DC) conversion circuit that converts an alternating current into a direct current. The first conversion circuit 30 is, for example, an AC adaptor. The first conversion circuit 30 converts the AC current supplied from an AC power supply 2 into a DC current and outputs the DC current to the base board 50.

The UPS 40 is an uninterruptible power supply device that supplies power in the event of a power outage. More specifically, the UPS 40 supplies power to each component of the information processing apparatus 1 when no AC current is supplied from the AC power supply 2. For example, the UPS 40 supplies power to the first motherboard 10 and the second motherboard 20 via the base board 50.

The base board 50 is a board to which a plurality of motherboards are connected. The base board 50 is a board to which electric power is supplied from the UPS 40 when a power outage is detected. The base board 50 outputs the electric power supplied from the UPS 40 to the first motherboard 10 and the second motherboard 20.

The base board 50 includes an OR circuit 501, an AND circuit 502, a second conversion circuit 503, a power outage monitoring circuit 504, a first buffer circuit 505, a second buffer circuit 506, a switch circuit 507, a first rectifier circuit 508, a second rectifier circuit 509, a constant voltage circuit 510, and a third conversion circuit 511.

The OR circuit 501 acquires, from each of the plurality of motherboards, an activation notification signal indicating an activation state of the motherboard. Then, the OR circuit 501 outputs an aggregate activation notification signal indicating whether or not there is a motherboard that is being activated among the plurality of motherboards included in the information processing apparatus 1.

More specifically, the OR circuit 501 acquires the first activation notification signal from the first power supply circuit 102 of the first motherboard 10. Further, the OR circuit 501 acquires the second activation notification signal from the second power supply circuit 202 of the second motherboard 20.

When at least one of the first activation notification signal from the first power supply circuit 102 and the second activation notification signal from the second power supply circuit 202 indicates being activated (i.e., the high level), the OR circuit 501 outputs an aggregate activation notification signal indicating that any one of the motherboards is being activated (i.e., the high level). On the other hand, when both the first activation notification signal from the first power supply circuit 102 and the second activation notification signal from the second power supply circuit 202 indicate that the respective motherboards are not activated (i.e., the low level), the OR circuit 501 outputs an aggregate activation notification signal indicating that all motherboards are not activated (i.e., the low level).

The AND circuit 502 acquires, for each of the plurality of motherboards, a UPS setting signal indicating a setting of whether power is to be supplied from the UPS 40 during a power outage. Then, the AND circuit 502 outputs an aggregate UPS setting signal indicating whether or not there is a motherboard that is set to be supplied with power from the UPS 40 among the plurality of motherboards included in the information processing apparatus 1.

More specifically, the AND circuit 502 acquires the first UPS setting signal from the first microcomputer 101 of the first motherboard 10. Further, the AND circuit 502 acquires the second UPS setting signal from the second microcomputer 201 of the second motherboard 20.

When at least one of the first UPS setting signal from the first microcomputer 101 and the second UPS setting signal from the second microcomputer 201 indicates that power is to be supplied (i.e., the low level), the AND circuit 502 outputs an aggregate UPS setting signal indicating that power is to be supplied to any one of the motherboards (i.e., the low level). On the other hand, when both of the first UPS setting signal from the first microcomputer 101 and the second UPS setting signal from the second microcomputer 201 indicate that power is not to be supplied (i.e., i.e., the high level), the AND circuit 502 outputs an aggregate UPS setting signal indicating that no power is to be supplied to any motherboards (i.e., the high level).

Here, the first UPS setting signal and the second UPS setting signal are low when power is to be supplied from the UPS 40 during a power outage. Therefore, when the UPS settings indicate that power is to be supplied to any one of the motherboards, the AND circuit 502 outputs the aggregate UPS setting signal of the low level.

The second conversion circuit 503 is a circuit including a DC-DC converter that converts a DC voltage suitable for the base board 50. More specifically, the second conversion circuit 503 receives the input of the DC current output from the first conversion circuit 30. The second conversion circuit 503 converts the voltage of the DC current input from the first conversion circuit 30 into a DC voltage suitable for the base board 50, and outputs the DC voltage.

The power outage monitoring circuit 504 is a circuit that detects a power outage. In other words, the power outage monitoring circuit 504 is a circuit that monitors the stop of the power supply from the AC power supply 2. For example, the power outage monitoring circuit 504 determines that a power outage has occurred when the DC voltage output from the second conversion circuit 503 becomes less than a threshold value. That is, the power outage monitoring circuit 504 determines that the power supply from the AC power supply 2 has stopped.

The first buffer circuit 505 is a circuit having a three-state buffer for switching whether or not to output a power outage detection signal based on the aggregate activation notification signal from the OR circuit 501. The first buffer circuit 505 outputs a power outage detection signal indicating that a power outage has been detected by the power outage monitoring circuit 504 to the second buffer circuit 506 when the aggregate activation notification signal indicating that any one of the motherboards is being activated is acquired from the OR circuit 501. When the condition is not satisfied, the first buffer circuit 505 shuts off the power outage detection signal.

More specifically, the first buffer circuit 505 outputs the power outage detection signal input from the power outage monitoring circuit 504 when the aggregate activation notification signal indicating that any one of the motherboards is being activated (i.e., the high level) is input from the OR circuit 501. On the other hand, the first buffer circuit 505 does not output the power outage detection signal input from the power outage monitoring circuit 504 when the aggregate activation notification signal indicating that all the motherboards are not activated (i.e., the low level) is input from the OR circuit 501. In other words, the first buffer circuit 505 interrupts the connection between the power outage monitoring circuit 504 and the second buffer circuit 506.

The second buffer circuit 506 is a circuit having a three-state buffer for switching whether or not to output the power outage detecting signal based on the aggregate UPS setting signal from the AND circuit 502. The second buffer circuit 506 outputs a power outage detection signal to the switch circuit 507 when the aggregate UPS setting signal indicating that power is to be supplied from the UPS 40 at the time of a power outage is acquired from the AND circuit 502. When the condition is not satisfied, the second buffer circuit 506 shuts off the power outage detection signal.

More specifically, the second buffer circuit 506 outputs the power outage detecting signal input from the first buffer circuit 505 when the aggregate UPS setting signal indicating that power is to be supplied to any one of the motherboards (i.e., the low level) is input from the AND circuit 502 on any motherboard. That is, when the aggregate UPS setting signal indicating that no power is to be supplied to any motherboards (i.e., the high level) is input from the AND circuit 502 on all motherboards, the second buffer circuit 506 does not output the power outage detecting signal input from the power outage monitoring circuit 504. In other words, the second buffer circuit 506 interrupts the connection between the first buffer circuit 505 and the switch circuit 507.

The switch circuit 507 is a circuit that switches whether or not power is supplied from the UPS 40 based on the power outage detecting signal output from the second buffer circuit 506. For example, the switch circuitry 507 includes a Metal-Oxide-Semiconductor Field Effect Transistor (MOSFET).

When a power outage is detected from the power outage monitoring circuit 504 and one of the first activation notification signal and the second activation notification signal acquired by the OR circuit 501 indicates that the motherboard is being activated, the switch circuit 507 causes the power supplied from the UPS 40 to flow to the first motherboard 10 and the second motherboard 20 unless both of the first UPS setting signal and the second UPS setting signal acquired by the AND circuit 502 indicate that no power is to be supplied.

The switch circuit 507 supplies a current supplied from the UPS 40 when a power outage detecting signal indicating that a power outage has occurred is input from the second buffer circuit 506. For example, in the switch circuit 507, when a power outage detection signal is input to the gate terminal, a channel is formed between the source terminal and the drain terminal. Accordingly, the switch circuit 507 supplies the electric power supplied from the UPS 40 to the second rectifier circuit 509. On the other hand, the switch circuit 507 stops the current supplied from the UPS 40 when a power outage detecting signal indicating that a power outage has occurred is not input from the second buffer circuit 506. That is, the switch circuit 507 does not flow the power supplied from the UPS 40 to the second rectifier circuit 509.

The first rectifier circuit 508 is a circuit including a diode for rectifying the direct current output from the second conversion circuit 503. In other words, the first rectifier circuit 508 prevents current from flowing in the reverse direction.

The second rectifier circuit 509 is a circuit having a diode for rectifying the direct current output from the switch circuit 507. In other words, the second rectifier circuit 509 prevents current from flowing in the reverse direction.

The constant voltage circuit 510 is a circuit that outputs a constant voltage DC current to the third conversion circuit 511. For example, the constant voltage circuit 510 includes a Zener diode to output the constant voltage. More specifically, the constant voltage circuit 510 outputs the direct current supplied from the first rectifier circuit 508 or the second rectifier circuit 509 to the third conversion circuit 511 at the constant voltage.

The third conversion circuit 511 is a circuit that converts a DC voltage suitable for a supply destination. More specifically, the third conversion circuit 511 converts the DC current output from the constant voltage circuit 510 into a DC voltage suitable for the supply destination of the information processing apparatus 1. Then, the third conversion circuit 511 outputs the converted DC voltage to each supply destination of the information processing apparatus 1. For example, the third conversion circuit 511 outputs the DC voltage converted into the first motherboard 10 or the second motherboard 20.

Next, an operation of the information processing apparatus 1 will be described. Here, at least one of the first motherboard 10 and the second motherboard 20 is activated, and the UPS settings indicate that power is to be supplied thereto.

The first conversion circuit 30 converts the AC current supplied from the AC power supply 2 into a DC current and outputs the DC current. The second conversion circuit 503 converts the DC current output from the first conversion circuit 30 into a DC voltage suitable for the base board 50 and outputs the DC voltage.

The first rectifier circuit 508 rectifies the direct current output from the second conversion circuit 503. The constant voltage circuit 510 outputs the DC current output from the first rectifier circuit 508 to the third conversion circuit 511 at a constant voltage.

The third conversion circuit 511 converts the voltage into a DC voltage suitable for the first motherboard 10 and the second motherboard 20, and outputs the DC voltage.

The power outage monitoring circuit 504 detects a power outage, in other words, a stop of power supply from the AC power supply 2, based on the voltage of the current voltage output from the second conversion circuit 503. When the stop of the power supply from the AC power supply 2 is detected, the power outage monitoring circuit 504 outputs a power outage detection signal indicating that a power outage has occurred.

The first buffer circuit 505, since the aggregate activation notification signal indicating that the first motherboard 10 or the second motherboard 20 is being activated (i.e., the high level) is input, outputs the power outage detection signal input from the power outage monitoring circuit 504.

Since the second buffer circuit 506 receives an aggregate UPS setting signal indicating that power is to be supplied to the first motherboard 10 or the second motherboard 20 (i.e., the low level), the power outage detecting signal input from the first buffer circuit 505 is outputted.

The switch circuit 507 supplies power supplied from the UPS 40 to the first rectifier circuit 508 because the power outage detecting signal is inputted from the second buffer circuit 506.

The third conversion circuit 511 converts the electric power input via the first rectifier circuit 508 and the constant voltage circuit 510 into a DC voltage suitable for the first motherboard 10 and the second motherboard 20, and outputs the DC voltage.

Figure 2:
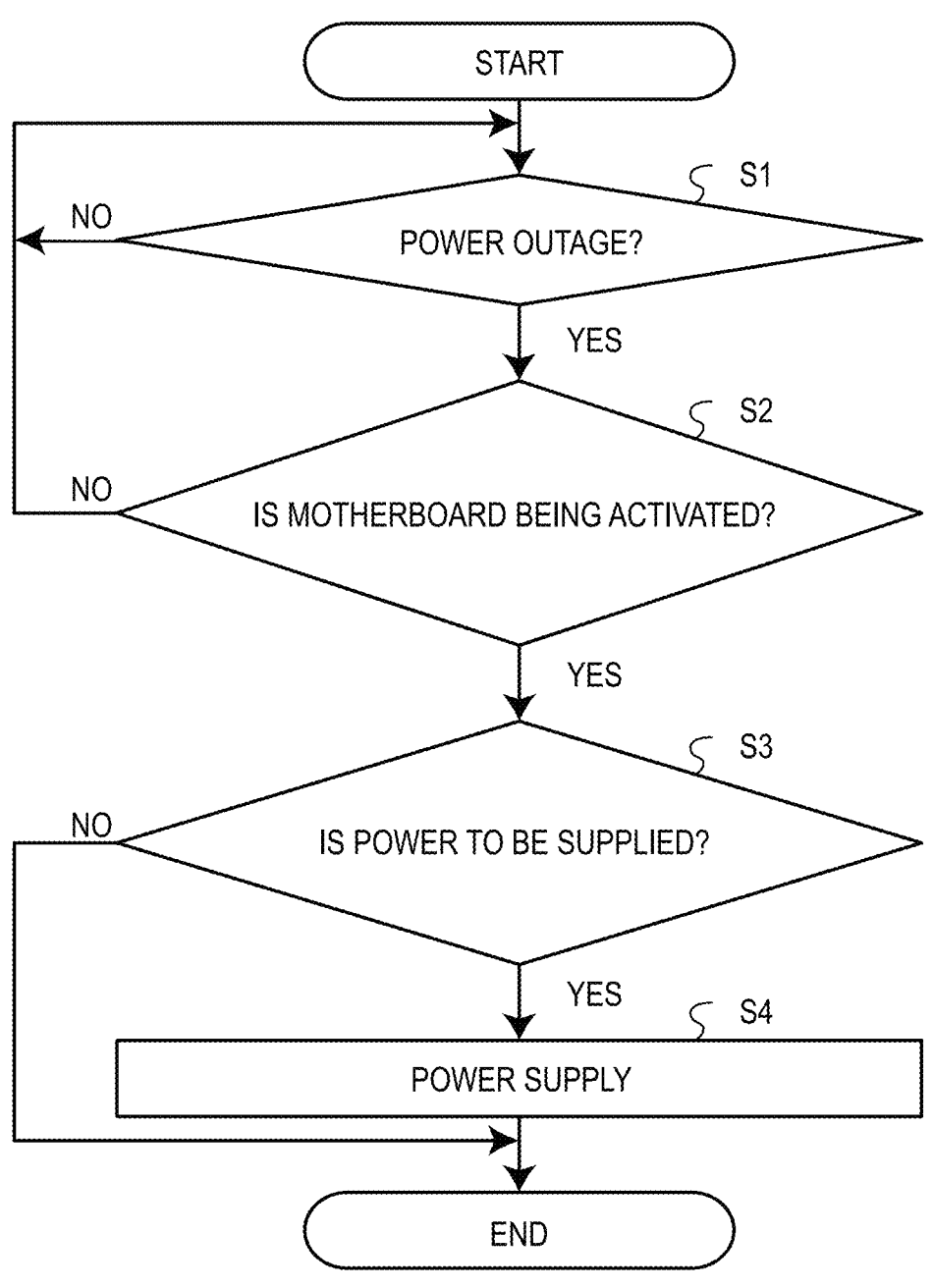
FIG. 2 is a flowchart of a power supply process executed by the information processing apparatus.

Next, a power supply process executed by the information processing apparatus 1 according to an embodiment will be described. FIG. 2 is a flowchart illustrating a flow of a power supply process executed by the information processing apparatus 1.

The power outage monitoring circuitry 504 determines whether or not a power outage has been detected (Step S1). When the power outage is not detected (S1, No), the power outage monitoring circuitry 504 stands by.

When a power outage is detected (Step S1, Yes), the first buffer circuit 505 determines whether the first motherboard 10 or the second motherboard 20 is being activated (Step S2). When the first motherboard 10 and the second motherboard 20 are not being activated (Step S2, No), the information processing apparatus 1 proceeds to Step S1.

When the first motherboard 10 or the second motherboard 20 is being activated (Step S2, Yes), the second buffer circuit 506 determines whether the UPS setting indicates that power is to be supplied to the first motherboard 10 or the second motherboard 20 (Step S3). When the UPS setting indicates that power is not to be supplied (S3, No), the information processing apparatus 1 ends the power-supply process.

When the UPS setting indicates that power is to be supplied (Step S3, Yes), the switch circuit 507 supplies the electric power supplied from the UPS 40 to each unit via the third conversion circuit 511 (Step S4).

Thus, the information processing apparatus 1 ends the power supply process.

As described above, the OR circuit 501 of the information processing apparatus 1 acquires the first activation notification signal and the second activation notification signal indicating the activation states of the first motherboard 10 and the second motherboard 20, respectively. Further, the information processing apparatus 1 detects a power outage of the AC power supply 2. When a power outage is detected by the power outage monitoring circuit 504 and the first activation notification signal and the second activation notification signal acquired by the OR circuit 501 indicate that the first motherboard 10 or the second motherboard 20 is being activated, the switch circuit 507 causes the power supplied from the UPS 40 to flow to the first motherboard 10 and the second motherboard 20 via the third conversion circuit 511. Therefore, the information processing apparatus 1 can receive power from the UPS 40 until a plurality of motherboards shut down when a power outage occurs.

Modification 1

The first microcomputer 101 described above is mounted on the first motherboard 10. However, the first microcomputer 101 is not limited to the first motherboard 10, and may be mounted on another substrate. For example, the first microcomputer 101 may be mounted on the base board 50 or may be mounted on a substrate not shown in FIG. 1.

The second microcomputer 201 described above is mounted on the second motherboard 20. However, the second microcomputer 201 is not limited to the second motherboard 20, and may be mounted on another substrate. For example, the second microcomputer 201 may be mounted on the base board 50 or may be mounted on a substrate not shown in FIG. 1.

Modification 2

The base board 50 described above receives the first UPS setting signal and the second UPS setting signal from the first microcomputer 101 and the second microcomputer 201. However, when power is supplied from the UPS 40 at all times during a power outage, the base board 50 may not receive the first UPS setting signal and the second UPS setting signal because the first UPS setting signal and the second UPS setting signal with power supply are received at all times. In this case, the base board 50 may not include the AND circuit 502 and the second buffer circuit 506. The first buffer circuit 505 may output a power outage detection signal to the switch circuit 507.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing apparatus connectable to an uninterruptible power supply (UPS), comprising:

a plurality of motherboards;

a first circuit connected to the motherboards to receive respective first signals from the motherboards, each of the first signals being of a low level indicating that the corresponding motherboard is not operating or a high level indicating that the corresponding motherboard is operating;

a second circuit connected to the motherboards to receive respective second signals from the motherboards, each of the second signals being of a low level indicating that power is to be supplied from the UPS to the corresponding motherboard during a power outage and a high level indicating that power is not to be supplied from the UPS to the corresponding motherboard during the power outage;

a third circuit configured to output a third signal upon detecting the power outage;

a fourth circuit connected to the first through third circuits and configured to receive power from the UPS;

a fifth circuit directly connected to the first and third circuits; and a sixth circuit directly connected to the second, fourth, and fifth circuits, wherein each of the motherboards includes:

a power supply circuit that supplies external power to the corresponding motherboard and that is configured to output the first signal to the first circuit, and a microcomputer that stores a setting indicating whether power is to be supplied from the UPS to the corresponding motherboard during the power outage and that is configured to output the second signal to the second circuit, the first circuit is an OR circuit, the second circuit is an AND circuit, upon receipt of the third signal from the third circuit, the fifth circuit outputs a fourth signal to the sixth circuit when a signal that is output from the OR circuit is a high level, upon receipt of the fourth signal from the fifth circuit, the sixth circuit outputs a fifth signal to the fourth circuit when a signal that is output from the AND circuit is a low level, and in response to receiving the fifth signal from the sixth circuit, the fourth circuit supplies power from the UPS to the motherboards.

2. The information processing apparatus according to claim 1, wherein each of the fifth and sixth circuits includes a three-state buffer.

3. The information processing apparatus according to claim 1, further comprising:

a base board between the motherboards and the UPS and on which the first through sixth circuits are disposed.

4. The information processing apparatus according to claim 3, further comprising:

a first conversion circuit connected to the third circuit on the base board and by which a first direct voltage for operating the base board is generated.

5. The information processing apparatus according to claim 4, further comprising:

a second conversion circuit connectable to an external power source, wherein the second conversion circuit converts an alternating voltage applied by the external power source to a second direct voltage to be applied to the first conversion circuit.

6. A method performed by an information processing apparatus having an uninterruptible power supply (UPS), the method comprising:

acquiring a plurality of first signals from power supply circuits of a plurality of motherboards, each of the first signals being of a low level indicating that the corresponding motherboard is not operating or a high level indicating that the corresponding motherboard is operating;

acquiring a plurality of second signals from microcomputers of the motherboards, each of the second signals being of a low level indicating that power is to be supplied from the UPS to the corresponding motherboard during a power outage and a high level indicating that power is not to be supplied from the UPS to the corresponding motherboard during the power outage;

detecting the power outage and outputting a third signal;

upon receipt of the third signal, outputting a fourth signal when a signal that is output from an OR circuit to which the plurality of first signals are input, is a high level;

upon receipt of the fourth signal, outputting a fifth signal when a signal that is output from an AND circuit to which the plurality of second signals are input, is a low level; and upon receipt of the fifth signal, supplying power from the UPS to the motherboards.

7. An information processing apparatus comprising:

an uninterruptible power supply (UPS);

a plurality of motherboards;

a first circuit connected to the motherboards to receive respective first signals from the motherboards, each of the first signals being of a low level indicating that the corresponding motherboard is not operating or a high level indicating that the corresponding motherboard is operating;

a second circuit connected to the motherboards to receive respective second signals from the motherboards, each of the second signals being of a low level indicating that power is to be supplied from the UPS to the corresponding motherboard during a power outage and a high level indicating that power is not to be supplied from the UPS to the corresponding motherboard during the power outage;

a third circuit configured to output a third signal upon detecting the power outage;

a fourth circuit connected to the first through third circuits and the UPS;

a fifth circuit directly connected to the first and third circuits; and a sixth circuit directly connected to the second, fourth, and fifth circuits, wherein each of the motherboards includes:

a power supply circuit that supplies external power to the corresponding motherboard and that is configured to output the first signal to the first circuit, and a microcomputer that stores a setting indicating whether power is to be supplied from the UPS to the corresponding motherboard during the power outage and that is configured to output the second signal to the second circuit, the first circuit is an OR circuit, the second circuit is an AND circuit, upon receipt of the third signal from the third circuit, the fifth circuit outputs a fourth signal to the sixth circuit when a signal that is output from the OR circuit is a high level, upon receipt of the fourth signal from the fifth circuit, the sixth circuit outputs a fifth signal to the fourth circuit when a signal that is output from the AND circuit is a low level, and in response to receiving the fifth signal from the sixth circuit, the fourth circuit supplies power from the UPS to the motherboards.

* * * * *